United States Patent

[11] 3,588,478

| [72] | Inventor | Myron L. Anthony<br>La Grange, Ill. |
|---|---|---|
| [21] | Appl. No. | 762,923 |
| [22] | Filed | Sept. 26, 1968 |
| [45] | Patented | June 28, 1971 |
| [73] | Assignee | Thomas E. Dorn<br>Clarendon Hills, Ill.<br>a part interest<br>Continuation-in-part of application Ser. No. 666,763, Sept. 11, 1967, which is a division of application Ser. No. 356,462, Apr. 1, 1964, now Patent No. 3,344,665, dated Oct. 3, 1967. |

[54] DEAD RECKONING NAVIGATION POSITION COMPUTERS
18 Claims, 7 Drawing Figs.

[52] U.S. Cl. .................................................. 235/150.27, 73/178, 235/61
[51] Int. Cl. ...................................................... G06f 15/50
[50] Field of Search ........................................... 73/178; 235/61, 150.271, 150.27; 33/1; 343/112; 244/77 (Inquired)

[56] References Cited
UNITED STATES PATENTS

| 2,929,553 | 3/1960 | Child | 235/61 |
| 3,070,796 | 12/1962 | Gray | 343/112 |
| 3,103,579 | 9/1963 | Green | 235/150.27 |
| 3,140,482 | 7/1964 | Duncan et al. | 73/178X |

Primary Examiner—Donald O Woodiel
Attorney—Kinzer, Dorn and Zickert

ABSTRACT: Inertial navigation systems in which basic position data is supplied to a position display device from a dead reckoning computer that resolves the outputs of speed and heading detection apparatus into coordinate position signals. Mechanical and electrical integrator systems are utilized as the basic dead reckoning computers. In the preferred constructions, the dead reckoning computer is continuously updated, in accordance with the output from a radio navigation receiver means, to correct the operation of the computer at a rate commensurate with the maximum overall drift rate of the sensing devices and the computer.

INVENTOR.
MYRON L. ANTHONY 3,588,478

1

DEAD RECKONING NAVIGATION POSITION COMPUTERS

CROSS REFERENCES TO RELATED PATENTS AND APPLICATIONS

This application is a continuation-in-part of application Ser. No. 666,763, filed Sept. 11, 1967 entitled "Control System for Aircraft Navigation Display and Auto-Pilot," which application in turn was a division of application Ser. No. 356,462, filed Apr. 1, 1964 entitled "Instrumentation Systems," now U.S. Pat. No. 3,344,665 issued Oct. 3, 1967. A related application that is also a division of Ser. No. 356,462 is application Ser. No. 666,905 filed Sept. 11, 1967, and entitled "Aircraft Attitude Indicator Devices."

BACKGROUND OF THE INVENTION

This invention relates to new and improved aircraft navigation systems and particularly to systems for computing and displaying the aircraft position, continuously, on a dead reckoning basis.

The increasing multitudes of aircraft, both commercial and private, make it increasingly desirable for each pilot to have accurate information with respect to the position of the aircraft at all times. Existing navigational aids, and particularly those that permit the pilot to fly on any course without the necessity of flying intersecting radials over radio navigation sources, are relatively expensive and frequently inadequate in performance. This is particularly true with respect to position display systems that are wholly dependent upon received radio navigation signals, since there are areas in which the radio navigation signals cannot be received or are unreliable. For example, in low flying where there may be an obstruction of substantial size between the radio navigation transmitter and the aircraft, the received signals may leave substantial gaps sufficient that the pilot may lose track of his position almost completely. Externally developed signal interference and multipath signal reflections can produce the same results, materially increasing the possibility of a disaster due to loss of position data on the part of the pilot.

The hazard is, of course, increased in instrument flying conditions.

Dead reckoning navigation systems, and equivalent inertial navigation systems, have been proposed in the past. However, systems of this kind have been accurate only for relatively short time intervals, since virtually any of the speed, acceleration, heading, and other sensing devices used to drive the systems have at least some appreciable drift rate. Moreover, the available input devices for systems of this kind that have low drift rates have been quite expensive, inordinately so for most private pilots.

SUMMARY OF THE INVENTION

It is an object of the present invention, therefore, to provide a new and improved dead reckoning computer system for a navigation position display that exhibits long term reliability and accuracy, particularly in comparison with previously known devices.

Another object of the invention is to provide an inexpensive and economical inertial navigation system, based upon a dead reckoning computer, that nevertheless affords accurate position data to a pilot over relatively long time intervals.

Another object of the invention is to provide for effective up-dating of a dead reckoning position computer in accordance with information from radio navigation facilities to afford accurate position information even though radio reception may be erratic or may even be interrupted for substantial time intervals.

Accordingly, the invention relates to a control system for a navigation system of limited long term stability comprising appropriate sensing devices for developing primary position data signals (e.g., a speed signal and a heading signal), a position display device, and radio navigation receiver means. The control system comprises a dead reckoning computer for resolving the primary data signals into two main coordinate position signals that are used to actuate guidance instruments or the position display. The dead reckoning computer may be a mechanical device or may be an electrical computing apparatus. The control system includes means for developing two auxiliary coordinate position signals from the output of the radio navigation receiver means; any conventional radio navigation system may be employed. Comparison means are provided for comparing the auxiliary position signals from the navigation radio receivers with the main position signals to develop position error signals. The control system further includes means for correcting the main position signals in accordance with the position error signals at a rate determined by the maximum overall drift rate of the sensing devices and the computer means.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE PREFERRED EMBODIMENTS

GENERAL CONTROL SYSTEM

Figure 1:
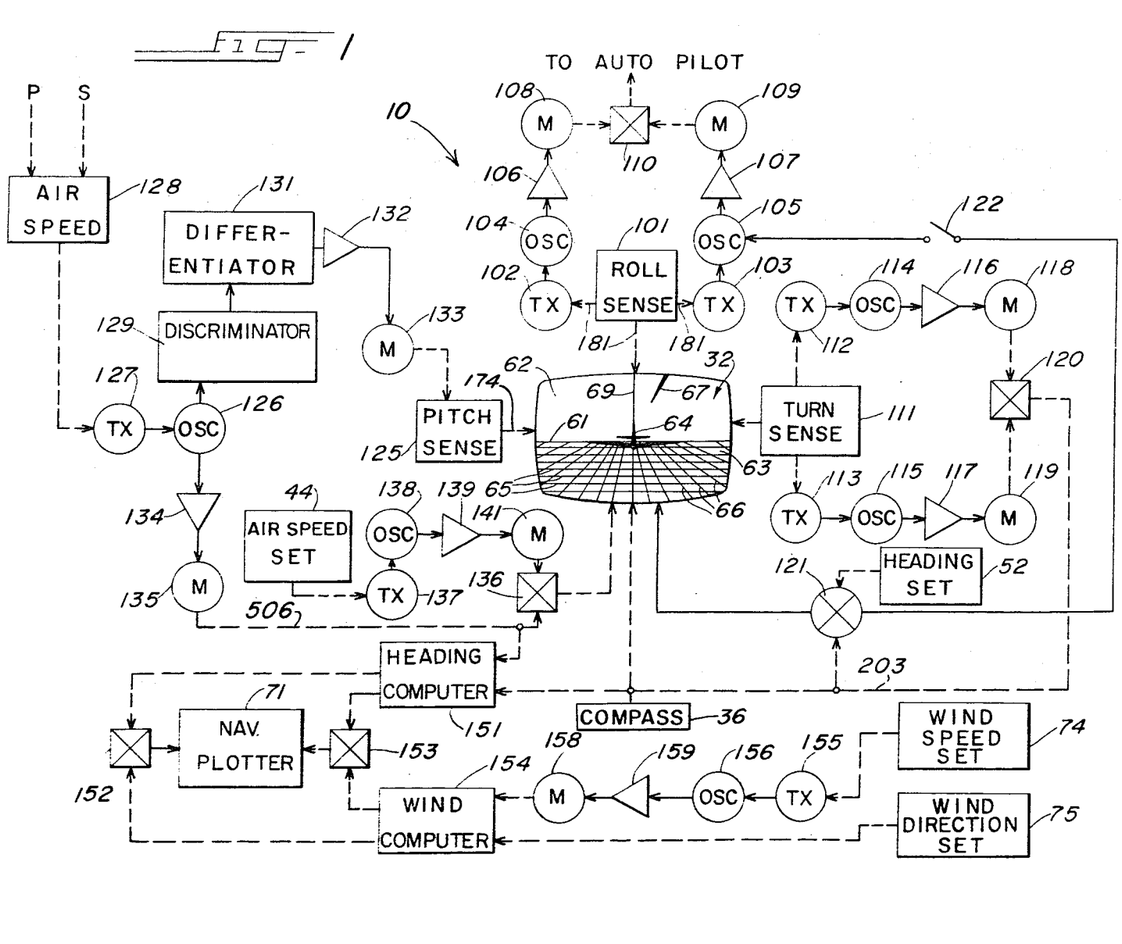
FIG. 1 is a schematic block diagram of a control system incorporating one embodiment of the present invention.

FIG. 1 is a partially schematic block diagram of a control system 10 for controlling an attitude display 32 and a position display device 71; system 10 includes a position computer control constructed in accordance with one embodiment of the present invention. Control system 10 comprises a roll sensing device 101 that senses rotational movement of the aircraft about its longitudinal axis. Device 101 is mechanically connected to an attitude indicator 64 in display 32 and rotates indicator 64 in a clockwise or counterclockwise direction to afford the pilot a direct indication of the roll attitude of the aircraft.

Roll sensing device 101 is also connected to a pair of transducers 102 and 103. Each of transducers 102 and 103 is constructed to transform mechanical movement of the roll sensing device into an electrical signal that varies in some respect in response to changes in the roll attitude of the aircraft. Typically, each of these transducers may comprise a rotary differential transformer such as a synchro transmitter, or a rotary transducer of the kind described in U.S. Pat. No. 2,707,232 to Robert Adler.

Transducers 102 and 103 produce complementary outputs; thus, an increase in the output from transducer 102 is matched by a decrease in the output from transducer 103. Transducer 102 is coupled to an oscillator 104 and is utilized to control the frequency of that oscillator. Similarly, the output signal from transducer 103 modulates and controls the operating frequency of a second oscillator 105.

The output signals from oscillators 104 and 105 are supplied to two individual limiting amplifiers 106 and 107, respectively. The output of amplifier 106 is utilized to drive a first synchronous stepping motor 108 and the output of amplifier 107 is supplied to and drives a second similar motor 109. Motors 108 and 109 may comprise conventional magnetic pulse stepping motors. These two motors are employed to drive an auto-pilot; accordingly, some substantial torque output is required from each motor. In a typical system, the available torque output of motors 108 and 109 may be of the order of eleven inch ounces. The two motors 108 and 109 drive a gear differential 110 that is mechanically connected to the auto-pilot for driving the ailerons of the aircraft.

The turn attitude control in the system of FIG. 1 is in many respects substantially similar to that employed for roll attitude control. Thus, system 10 includes a turn rate (yaw) sensing device 111. Device 111 may constitute the operating mechanism of a conventional gyro turn indicator. The yaw sensing device may be mechanically connected to indicator 64 of attitude display 32 to move the attitude indicator to the left or to the right of center line 69 to indicate rotational movement of the aircraft about its vertical axis.

Turn sensing device 111 is mechanically connected to a pair of transducers comprising the variable turns ratio transformers 112 and 113. The mechanical connection is such that the signal outputs from transducers 112 and 113 are complementary in nature. That is, a turning movement of the aircraft in one direction increases the amplitude of the output signal from transducer 112 and correspondingly reduces the output signal from transducer 113; a turning movement in the opposite direction increases the output from transducer 113 and decreases the output from transducer 112.

Transducer 112 is electrically coupled, in a frequency control circuit, to an oscillator 114. Oscillator 114, in turn, is coupled through a limiting amplifier 116 to a synchronous pulse stepping motor 118. Similarly, the output signal from transducer 113 modulates the frequency of an oscillator 115, the output signal from oscillator 115 being supplied through an amplifier 117 to a similar small synchronous motor 119.

The two stepping motors 118 and 119 are employed to drive a small gear differential device 120. Differential 120 is mechanically connected to the rotational mechanism for a radial direction scale 66 in display 32. Device 120 also drives the heading scale of a compass 36.

Differential 120 is also utilized to drive an electrical comparator or differential device 121. Although device 121 could be a mechanical device, it preferably constitutes a rotary potentiometer bridge, producing an electrical output signal that varies in sign and amplitude depending upon the rotational position of the bridge. Device 121 is also connected to a settable heading adjusting device 52. Thus, device 121 compares a preset heading from device 52 with the actual heading as determined by integration of turning movements of the aircraft in device 120. The output from device 121 is utilized to drive a differential command pointer 67 through a drive mechanism (not shown) that, in essence, constitutes a conventional electrical meter movement. The differential bridge 121 may also be electrically connected, through a switch 122, to oscillator 105 in the auto-pilot control circuit to actuate the auto-pilot.

Another input device for control system 10 is a pitch sensing device 125. Pitch sensing device 125 may constitute an acceleration-corrected pendulum mechanism. The pitch sensing device is connected to attitude indicator 64 of attitude display 32 and is utilized to move the aircraft indicator upwardly or downwardly to indicate to the pilot any changes in the pitch attitude of the aircraft.

A principal component of the acceleration correction apparatus for pitch sensing device 125 is an oscillator 126. The operating frequency of oscillator 126 is varied in accordance with the output signal from a transducer 127, which again may be a rotary differential transformer. Transducer 127 may be driven by conventional apparatus 128 for determining the air speed of the aircraft, including the usual static and pitot tube connections.

The output signal from oscillator 126 is supplied to a discriminator 129 connected through a differentiator circuit 131 to a limiting amplifier 132. Discriminator 129 may be of the audiofrequency limited-pulse phase-multiplier type. A suitable discriminator that may be employed in the system is described and claimed in U.S. Pat. No. 3,024,419 of Myron L. Anthony, issued Mar. 26, 1962; other discriminator circuits may be utilized as desired. The differentiated output of the discriminator is applied to drive a motor 133 in either of two directions indicative of acceleration or deceleration of the aircraft. Motor 133 is mechanically connected to pitch sensing device 125 to correct the pitch sensing device output for acceleration changes.

The output signal from oscillator 126 is also applied through an amplifier 134 to a motor 135. Motor 135, like motors 118 and 119, may comprise a simple and inexpensive magnetic pulse stepping motor having a relatively low output torque. Typically, a motor affording an output torque of approximately 1 inch ounce may be employed. Motor 135 is utilized as one driving input to a small gear differential 136.

An air speed adjustment or setting device 44 is utilized to actuate a rotary transducer 137. The output signal from transducer 137 is applied to an oscillator 138 to vary the frequency of the oscillator. The output signal from oscillator 138 is supplied through an amplifier 139 to a motor 141. Motor 141 constitutes a second input device for gear differential 136. The output shaft of differential 136 is mechanically connected to display 32 to move a speed scale comprising the horizontal grid lines 65 of the display either upwardly or downwardly within a ground field 63 to indicate to the pilot whether the aircraft is exceeding or has fallen below the preset air speed.

As noted above, the output of motor 133 is representative of acceleration or deceleration of the aircraft. In some instances, it may be preferable to drive grid 65 from motor 133, presenting speed information in the main attitude display from the standpoint of acceleration rather than of a differential relative to the preset speed. Where this is done, auxiliary display for the differential speed, represented by the output of device 136, is preferably provided.

The differential device 120 that drives bridge 121 and the yaw-movement mechanism for attitude indicator 64 also affords a first mechanical input to a position or heading computer 151. Computer 151 is also mechanically coupled to the output of motor 135. Computer 151, different embodiments of which are described in detail hereinafter, integrates and resolves the air speed information (afforded by the drive from motor 135) and the heading information (taken from differential 120) into appropriate coordinate movements of an indicator "bug" 73 of plotter 71 (see FIGS. 2, 3). Thus, computer 151 has a north-south output connected to a first differential device 152 and with an east-west output connected to a second differential device 153. The two differentials 152 and 153 drive bug 73 in two coordinate directions to establish the position of the aircraft.

If there were no wind component in the motion of the aircraft, the differential devices 152 and 153 would be unnecessary. However, it is desirable to correct the information from heading computer 151 to take cognizance of the speed and direction of the wind.

To correct for prevailing wind conditions, the system is provided with an integrating wind computer 154 that is essentially similar in construction to heading computer 151. Computer 154 has two mechanical inputs, one taken directly from a wind direction setting or adjustment device 75. The second input is derived from a wind speed setting device 74, which adjusts a rotary transducer 155. The output signal from transducer 155 is used to control the frequency of an oscillator 156, oscillator 156 being connected to a drive motor 158 through a suitable amplifier 159. Again, motor 158 may comprise an inexpensive synchronous pulse stepping motor having a minimal torque of the order of 1 inch ounce.

As noted above, turn sensing device 111 may be connected mechanically to attitude indicator 64, but this is not essential because changes in yaw attitude are reflected in changes of aircraft heading, indicated by the rotational movement of the direction scale comprising radial lines 62 in display 32. The principal output from the turn sensing device 111, accordingly, is that derived from the two transducers 112 and 113, which directly control the operating frequencies of oscillators 114 and 115 respectively.

Changes in frequencies of the two oscillators are reflected in variations in rotational speed of the two stepping motors 118 and 119 driving the small gear differential 120. As long as the aircraft flies on a straight line without turning, sensing device 111 detects no change in the yaw attitude of the aircraft. Under these conditions, oscillators 114 and 115 operate at the same frequency and motors 118 and 119 rotate at substantially identical speeds. Accordingly, the output shaft of differential device 120 does not rotate and the radial indicator lines 66 in the display remain stationary. Whenever there is a turning movement of the aircraft, one of the motors 118 and 119 is driven faster than the other, there is an output from differential 120, and the radial grid comprising lines 66 rotates to indicate to the pilot that the aircraft is turning either left or right.

When a change in heading is desired, the new heading is set into the system by device 52, which adjusts the electrical bridge differential device 121. The resultant disturbance of the bridge balance causes the bridge to produce an output signal that drives the meter movement controlling the differential turn command pointer 67. As a consequence, the command pointer moves to the right or the left, depending upon the direction in which it is necessary to turn the aircraft in order to achieve the desired new heading. The pilot then turns the aircraft toward the new heading; as the new preset heading is approached, bridge 121 returns toward its balanced condition and command pointer 67 moves back toward its normal alignment with the centerline 69 of the display. As the aircraft nears the new heading, the increasing proximity of command pointer 67 to centerline 69 automatically guides the pilot in making a smooth flare-out from his turn.

In the initial portion of each flight, while the aircraft is being brought to the desired altitude, attitude, and heading, it is usually preferable to leave switch 122 open. Once the aircraft is flying on the desired heading, switch 122 can be closed. Thereafter, if a new heading is set in device 52, the unbalanced output signal from bridge 121 resulting from the heading change is applied to oscillator 105 to create an unbalanced condition between the operating frequency of oscillator 105 and oscillator 104. The resulting unbalanced condition in the roll control system is interpreted by that system as a banking movement of the aircraft, even though no actual bank has occurred and the roll sensing device 101 continues to show that the aircraft is in level flight. The auto-pilot connected to differential device 110 automatically operates to correct this error signal, representing an apparent banking of the aircraft, by banking the plane in the opposite direction and therefore turning the aircraft.

When the turning aircraft reaches the new heading that has been set into device 52, the output from bridge 121 again is reduced to a zero level and there is no further output signal supplied from the bridge to oscillator 105. Accordingly, the auto-pilot no longer attempts to correct for the error signal produced by the heading change, and flight is resumed on a level basis.

Control system 10 moves the horizontal grid lines 65 in accordance with rate variations between the air speed setting of device 54 and the actual air speed determined by device 128. The speed control is essentially similar to the roll and turn controls except that two input devices are used instead of one. Motor 135 is actuated in accordance with directly sensed air speed information from device 128, the control components including the air speed sensing device 128, transducer 127, oscillator 126, amplifier 134 and motor 135. Motor 141, on the other hand, is driven at a speed determined by the setting of device 44 through the chain of control devices comprising transducer 137, oscillator 138 and amplifier 139. Deviations of the actual air speed from the preset air speed are reflected in rotational movement of the output shaft of differential 136, which is driven by the two motors 135 and 141.

If the actual air speed exceeds the preset air speed, then the output shaft of differential 136 drives the speed grid 65 downwardly within window 32, giving the direct illusion that the plane is rushing forwardly over the ground at an excessive rate. Conversely, if the actual air speed is below the preset air speed, the lines of the speed scale move forwardly within the window, creating the illusion that the aircraft has slowed down to a point where it is "backing up." In connection with the speed grid 65 and the radial turning 62, rate information because the objective of the display is to inform the pilot only with respect to changes from the predetermined flight conditions. Stated differently, there is no necessity for the pilot to gauge the actual speed of movement of either of these grids; if either grid moves, then the pilot knows that the aircraft has deviated from the planned flight.

Pitch sensing device 125 moves indicator 64 upwardly and downwardly within the display field of device 32 to indicate diving or climbing movement of the aircraft. The output from oscillator 126, which is indicative of changes in air speed, is discriminated, differentiated, and amplified in circuits 129, 131 and 132 to obtain a DC signal having an amplitude proportional to acceleration of the aircraft and a polarity representative of the direction of that acceleration. That is, the polarity of the output signal from circuit 132 indicates whether the aircraft is accelerating in a forward direction or is decelerating. Motor 133, which is a small DC magnetic torque motor, rotates in a direction determined by the polarity of the input signal and with a torque determined by the amplitude of that signal. This affords a correction in pitch sensing device 125 to prevent pitch errors in the sensing device, which would otherwise be occasioned by changes in acceleration of the aircraft, from being displayed. Thus, if the aircraft accelerates forwardly but maintains level flight, pitch sensing device 125 tends to produce an output indicating that the aircraft is climbing. This is corrected by motor 133 so that the display continues to afford an accurate indication of the actual pitch attitude of the aircraft. The same correction applies, of course, upon deceleration.

Heading computer 151 resolves the actual heading information derived from differential 120 and the air speed information from motor 135 into two integrated coordinate movements. The computer is provided with two output shafts; one drives differential 152 and the other drives differential 153. If there were no wind, the outputs of computer 151 could be used directly to drive the position indicator bug of plotter 71 to show the aircraft position. Again, it is necessary to correct this information for wind conditions and this is accomplished by the coordinate outputs of the similar computer 154. The computers are described in greater detail hereinafter.

Position Display

Figures 2, 3:
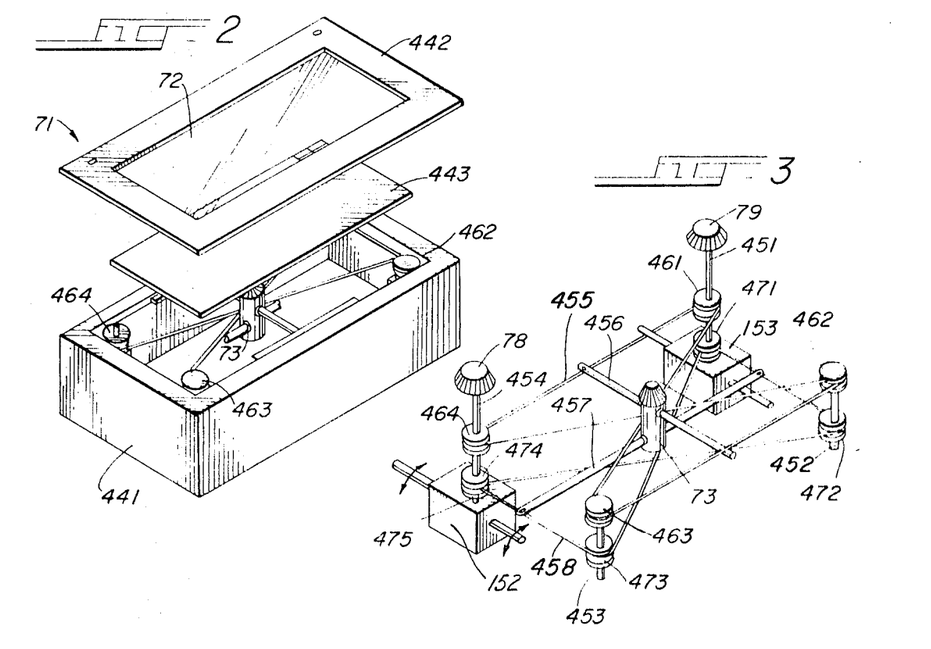
FIG. 2 is a simplified exploded perspective view of a position plotting display device that may be used in conjunction with the invention.
FIG. 3 is a partially schematic perspective view of a drive mechanism for the display device of FIG. 2.

The mechanical position display for the system, navigation plotter 71, may take the form illustrated in FIGS. 2 and 3. FIG. 2 presents an exploded perspective view of the display, whereas FIG. 3 affords a detail view of the operating mechanism employed to position the indicator bug 73 within the display.

As shown in FIG. 2, position display device 71 may include a generally rectangular housing 441 encompassing the display mechanism. Housing 441 is provided with a hinged or removable lid 442 of rectangular configuration having a transparent central window 72. A transparent or semitransparent map 443 is removably mounted over the top of housing 441 beneath frame 442, so that the map is exposed through the window 72.

A part of the operating mechanism for moving indicator 73 is shown in FIG. 2, but FIG. 3 affords a more complete and detailed view of this mechanism. As shown therein, there are four vertically oriented shafts 451, 452, 453 and 454 located at the four corners of the navigation plotter. A first flexible drive cord or similar drive member 455 extends around four pulleys 461, 462, 463 and 464 mounted in a common plane on shafts 451, 452, 453 and 454 respectively. Starting at shaft 451, it is seen that the drive cord 455 extends parallel to one side of the display to pulley 464, around pulley 464 and diagonally of the display to pulley 462. From pulley 462, cord 455 extends parallel to the other side of the display and around pulley 463 and thence diagonally across the display to pulley 461 again.

A first slide rod 456 is incorporated in the display mechanism. Slide rod 456 is affixed, at its opposite ends, to the two sections of cord 455 that extend parallel to the sides of the display housing. Movement of slide rod 456 parallel to the sides of the housing is employed to indicate north-south movement of the aircraft. To this end, bug 73 is provided with an aperture, slide rod 456 projecting through the aperture in the indicator bug.

Indicator bug 73 is also provided with a second aperture oriented at an angle of 90° with respect to the aperture that receives slide rod 456. A second slide rod 457 extends through this second aperture in the indicator bug, the opposite ends of slide rod 457 being secured to a second drive cord 458. Drive cord 458 extends around four additional pulleys 471, 472, 473 and 474 that are mounted upon shafts 461, 462, 463 and 464 respectively.

In the drive arrangement for slide rod 456, the first three pulleys 461, 462 and 463 are rotatable upon their respective shafts. Pulley 464 is affixed to shaft 454 for rotation therewith. An adjustment knob 78 may be affixed to or otherwise mechanically connected to shaft 454 to provide for manual adjustment of the north-south position of indicator bug 73. Shaft 454 is also mechanically connected to or connectable to the output shaft 475 of differential device 152. In FIG. 3 shafts 454 and 474 are shown as a common element, but it is usually desirable to afford a simple clutch connection for the shafts so that manual adjustment knob 78 can be actuated without driving differential device 152.

Similarly, only one of the pulleys for the second drive cord 458, pulley 471, is affixed to its shaft. The remaining pulleys are freely rotatable on their respective shafts. An east-west adjustment knob 79 is mechanically connected to the drive pulley 471 for the second cord 458, which controls the positioning of slide rod 457, and the east-west differential device 152 is also connected to the same pulley.

North-south movement of indicator knob 73 is accomplished by rotation of its drive pulley 464. Thus, if the drive pulley is rotated in a clockwise direction, slide rod 456 and indicator bug 73 are both driven toward the "north" end of the map. Similarly, if drive pulley 464 is rotated in a counter-clockwise direction, then slide rod 456 and indicator bug 73 move toward the "south" of the map. Rotation of the drive pulley may be accomplished by differential device 152 or by actuation of the adjusting knob 78. In the same manner, the drive pulley for slide rod 457 may be actuated to move indicator bug 73 to the "east" or the "west" with respect to the map 443 overlying the indicator bug (see FIG. 2).

Position Computer—Initial Embodiment

Figure 4:
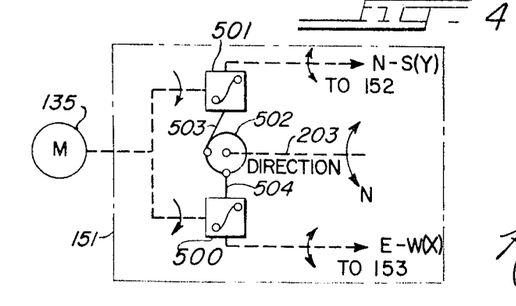
FIG. 4 is a simplified schematic diagram of a computer apparatus constructed in accordance with one embodiment of the invention.
Figure 5:
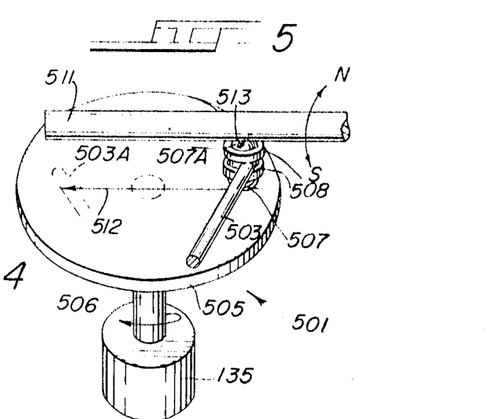
FIG. 5 is a simplified perspective view of a ball disc integrator used in the computer of FIG. 4.

FIGS. 4 and 5 illustrate the principal components of a position computer utilized to drive the two differential devices 152 and 153 which, in turn, drive position display 71 (FIGS. 1--3). As noted above, the digital drive system shown in FIG. 1 is equally applicable to the transducer, oscillator, and amplifier that drive motor 158 in accordance with the wind speed setting adjusted by device 74. Similarly, transducer 127, oscillator 126 and amplifier 134 drive motor 135 to afford actual air speed information in a usable form.

FIG. 4 is a partially schematic block diagram of position computer 151. As shown therein, motor 135, which rotates at a speed proportional to the air speed of the aircraft, is employed to drive a pair of ball disc integrator devices 500 and 501. The second input to the computer is controlled by the position of the output shaft 203 of differential 120 (see FIG. 1), which position varies as the time integral of changes in the heading of the aircraft. Rotational displacement of shaft 203 is employed to position a control disc 502 that is mechanically connected, by two positioning rods 503 and 504, to the two ball disc integrators 501 and 502, respectively. Positioning rods 503 and 504 are connected to disc 502 at points displaced by 90° with respect to each other so that the positions of the elements controlled by rods 503 and 504 are 90° displaced in phase with respect to each other.

FIG. 5 is a substantially simplified illustration of a ball disc integrator that may be utilized as the device 501. As shown therein, the integrator device 501 comprises a flat disc 505; disc 505 is shown directly mounted upon the output shaft 506 of motor 135. It will be understood that a suitable gear arrangement may be employed to drive the disc, since both of the integrators 501 and 502 are driven from the same motor. A ball bearing assembly comprising a pair of engaged balls 507 and 507A mounted within a suitable race member 508 is supported upon the top surface of disc 505. Race 508 is shown directly connected to the positioning rod 503; a suitable sliding yoke or other mechanical connection may be employed to obtain linear movement of race 508 in response to angular movement of rod 503. Inasmuch as there are a wide variety of known mechanical connections that are quite effective to afford the necessary translation of pivotal movement of the positioning rod to linear movement of the ball race, the yoke or other connecting mechanism has not been illustrated.

The output element of ball disc integrator 501, as shown in FIG. 5, comprises a shaft 511. Shaft 511 is disposed in frictional engagement with ball 507A of the bearing assembly. The shaft is aligned diametrically with disc 505, extending parallel to the diameter identified in the drawing by the arrow 512.

In the operation of ball disc integrator 501 (FIG. 5) disc 505 is rotated by motor 135. Since the output speed of motor 135 is determined by the air speed of the aircraft, the rotational speed of disc 505 is proportional to the air speed. With the ball bearing assembly in the position shown in FIG. 5, near the right-hand end of diametrical line 512, the ball is rotated at maximum speed with respect to the rotational speed of the motor. Assuming that motor 135 drives shaft 506 in a clockwise direction as illustrated, ball 507A rotates in the direction indicated by arrow 513. As a consequence, shaft 511 is rotated in a clockwise direction, arrow N. It may be assumed that this is representative of movement of the aircraft toward the north. If the aircraft speeds up, the change in velocity is reflected in an increase in rotational speed in the output shaft 506 of motor 135. The resulting increase in rotational velocity of disc 505 rotates balls 507 and 507A faster and drives shaft 511 faster. The direction of rotation of shaft 511 continues to indicate that the aircraft is moving due north, still assuming that ball 507 is at the extreme right-hand end of its movement along diametrical line 512.

If the aircraft is now turned through an angle of 90° in either direction, position control disc 502 (FIG. 4) is rotated through an angle of 90°. When this occurs, the resulting pivotal movement of position rod 503 brings ball race 508 to the canter of disc 505. Regardless of the rotational speed of disc 505, ball 507 is stationary when located at the exact center of the disc. Accordingly, shaft 511 is no longer rotated; this the desired condition with the aircraft moving due east or due west, since shaft 511 is used for north-south movement of the aircraft.

If disc 502 is now rotated through an additional angle of 90°, position rod 503 reaches the alternate extreme position generally indicated by dash outline 503A. This places the ball bearing assembly at the extreme left-hand end of its travel along the diametrical line 512. Ball 507 is again rotated by its engagement with disc 505 but now rotates in the opposite direction; hence ball 507A rotates in a direction opposite arrow 513. Consequently, output shaft 511 is now rotated, through its engagement with the ball, in a counterclockwise direction, arrow S, indicating that the aircraft is heading south. Of course, at points intermediate the two extreme positions 503 and 503A, shaft 511 is rotated in a direction that indicates the direction of movement of the aircraft but at a speed proportional to the distance of the ball bearing assembly from the center of disc 505.

Ball disc integrator 500 (FIG. 4) is a substantial duplicate of device 501 except that it is operated 90° out of phase with respect to the north-south integrator. With positioning disc 502 in the position shown in FIG. 4, the input of motor 135 is translated by computer 151 as due north movement. Rotation of disc 502 through any angle less than 90° causes both of the integrator output shafts to be rotated. Thus, the two ball disc integrators and the positioning device 502—504 are effective to resolve the air speed indication comprising the output of motor 135 into orthogonal components of the aircraft position that are representative, respectively, of the east-west and the north-south movements of the aircraft. The outputs of the two integrators position indicator 73. Ball disc integrators such as devices 500 and 501 are commercially available and are quite accurate in their operation; accordingly, the simplified illustration of FIG. 5 is sufficient, when taken in conjunction with FIG. 4, to afford an adequate understanding of the computer mechanism.

Wind computer 154 (FIG. 1) may be essentially identical to computer 151. The computed wind speed is supplied to computer 154 by the rotation of motor 158. The position or direction of the wind is established by adjustment of the positioning disc of this computer apparatus, using wind direction setting device 75. The two output shafts of wind computer 154 are connected to differential devices 152 and 153, as are the two output shafts of computer 151, the two differential devices completing the resolution of the air speed and wind speed information necessary for driving navigation plotter 71.

Position Computer Mechanically Corrected

From Radio Data Source

Figure 6:
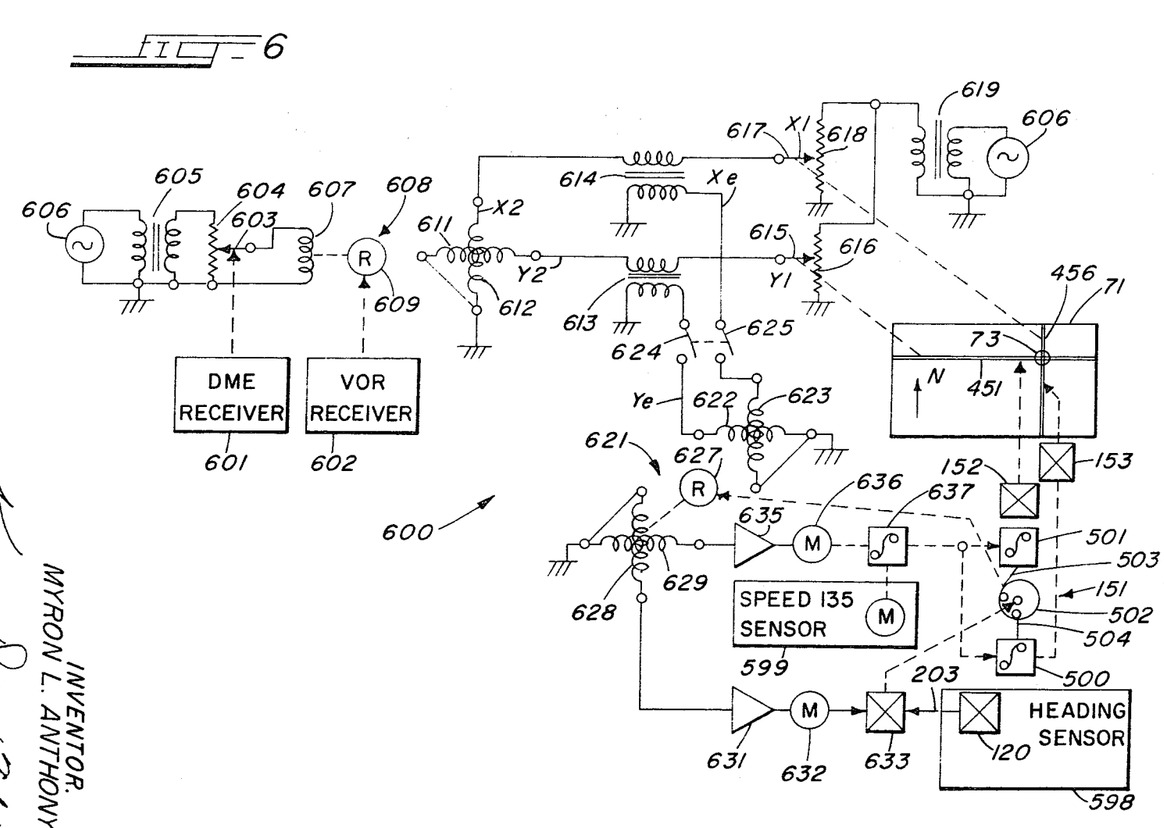
FIG. 6 is a schematic diagram of a dead reckoning computer control system constructed in accordance with another embodiment of the invention.

FIG. 6 illustrates, schematically, the principal components of a modified form of position computer in which the position display is continuously corrected in accordance with information derived from an outside source such as conventional radio navigation receivers. The dead reckoning navigation system 600 generally illustrated in FIG. 6 utilizes the output signals from heading and speed sensing devices 598 and 599 which may correspond to those described above in connection with FIG. 2. Thus, the primary position data for control of position display 71 may be derived from the output of a heading differential 120 and from the output of an air speed motor 135 as in the previously described embodiment. Furthermore, navigation system 600 utilizes a position computer 151, as described above, without substantial modification.

System 600 includes radio navigation means comprising a conventional DME receiver 601 and a VOR receiver 602. DME receiver 601 is employed to control the position of the variable tap 603 on a potentiometer 604. The end terminals of the potentiometer are connected to the secondary winding of a transformer 605, with one terminal returned to system ground. The primary of transformer 605 is connected to a signal generator 606 which preferably comprises a conventional AC signal generator and may be the main power generator of the aircraft.

The tap 603 of potentiometer 604 is electrically connected to the rotor winding 607 of an AC rotary resolver 608 having a rotor 609 and two stator windings 611 and 612. The position of rotor 609 and its winding 607 are controlled by the VOR receiver 602. Resolver 608 is utilized to develop, from the output of the radio navigation receiver means comprising receivers 601 and 602, two auxiliary coordinate position signals X2 and Y2. The one auxiliary position signal Y2 is generated in stator winding 611 and the coordinate auxiliary position signal X2 is developed in the stator winding 612.

One end terminal of each of the stator windings 611 and 612 in resolver 608 is connected to system ground. The other terminal of winding 611 is connected to one terminal of the primary winding of a differential transformer 613. Similarly, resolver winding 612 is connected to one terminal of the primary winding of a differential transformer 614. The Y-coordinate transformer 613 has the other terminal of its primary winding connected to the movable tap 615 of a potentiometer 616. The remaining terminal of the primary winding of the X-coordinate transformer 614 is similarly connected to the movable tap 617 of a potentiometer 618.

One terminal of each of the potentiometers 616 and 618 is grounded. The remaining terminals of the two potentiometers are connected together to the secondary winding of an input transformer 619. The primary winding of transformer 619 is energized from the signal generator 606, the same generator that energizes input transformer 605.

The secondary winding of differential transformer 613 is connected to one terminal of a stator winding 622 of a rotary AC resolver 621, the other terminal of winding 622 being returned to system ground. Similarly, the secondary winding of the X-coordinate transformer 614 is connected to one terminal of a second stator winding in resolver 621, the other terminal of winding 623 being returned to ground. A switch 624 may be interposed in the circuit between the secondary of transformer 613 and resolver winding 622 and a switch 625 may be incorporated in the circuit between the secondary of transformer 614 and resolver winding 623. Switches 624 and 625 are ganged for joint operation.

The rotor 627 of resolver 621 carries two orthogonal windings 628 and 629. One terminal of each of the rotor windings 628 and 629 is grounded. The output terminal of winding 628 is connected through an amplifier 631 to a motor 632 with the shaft of motor 632 comprising one input to a differential 633. The output of differential 633 is the bearing input to the position computer 151, the differential 633 being interposed between the output of the heading differential device 120 and the position computer in this embodiment of the invention.

The output of winding 629 of resolver 621 is connected to an amplifier 635 that is in turn coupled to a motor 636. Motor 636 comprises one input to a ball disc integrator or similar small mechanical integrator device 637 having a second input taken from the speed sensing device output, motor 135. In this embodiment of the invention, it is the output from integrator 637 that drives the two integrators 500 and 501 in the position plotter computer 151. The connections from computer 151 to display device 71 are the same as in the previously described systems and may include the differential devices 152 and 153 to incorporate wind data into the information afforded by the display. The X-coordinate positioning member or slide rod 456 is mechanically connected to the movable tap 617 of potentiometer 618 to control the position of that tap. Similarly, the north-south or Y-coordinate slide rod 457 of display device 71 is mechanically connected to the movable tap 615 of potentiometer 616 to control its position.

In considering the operation of the position computer or dead reckoning navigation system 600 illustrated in FIG. 6, it may first be assumed that switches 624 and 625 are open. With these two switches open, the system functions as a dead reckoning plotter on the basis of the outputs from the heading sensing device 598 and the speed sensing device 599. The operation is the same as described above in connection with FIGS. 1—5. The two integrators 500 and 501 are driven by the air speed motor 135, through integrator 637, at a speed proportional to the air speed of the aircraft.

The carriages of integrators 500 and 501 are positioned by the dual quadrature bell crank comprising disc 502 and links 503 and 504. Thus, the respective positions of the integrator carriages are determined by the heading of the aircraft on the basis of the data from the heading sensing device comprising differential 120. Integrators 500 and 501 resolve the primary position data from the sensing devices 598 and 599 into coordinate X and Y components and continuously position the display device indicator or bug 73 to show the position of the aircraft.

The position of the X-coordinate slide rod 456 of display device 71 is continuously monitored by the linkage of that slide rod to the potentiometer tap 617, so that the output signal at tap 617 is at all times a function of the east-west position shown on the display device. Similarly, the connection from the north-south slide rod 457 to the potentiometer tap 615 continuously adjusts that potentiometer so that the output signal at tap 615 is at all times representative of the Y-coordinate or north-south position shown on the position display 71.

In system 600, position updating information is obtained from the radio navigation receiver means comprising the DME receiver 601 and the VOR receiver 602. The distance information derived by DME receiver 601 adjusts the tap 603 on potentiometer 604 so that the amplitude of the signal supplied to the rotor winding 607 of resolver 608 is a function of distance from the radio navigation station. The bearing information derived by VOR receiver 602 positions the rotor 609 of resolver 608. The outputs developed in the two windings 611 and 612 of resolver 608 are coordinate position signals X2 and Y2 representative of the aircraft position as determined from the radio navigation signals.

The primary X-coordinate position information signal X1, derived from the dead reckoning plotter display 71 by potentiometer 618, is applied to the primary of transformer 614 along with the auxiliary position signal X2. The phase relations in the circuit for the primary winding of differential transformer 614 are such that no output signal is developed in the secondary winding of the transformer whenever the primary and auxiliary signals X1 and X2 are of equal amplitude. Whenever there is any appreciable difference in amplitude between the two signals supplied to the primary of differential transformer 614, however, an error signal Xe is developed in the secondary winding of the transformer.

In the same manner, differential transformer 613 compares the primary data position signal Y1, derived from the position display device 71 and its connection to potentiometer 616, with the Y2 coordinate signal derived from winding 611 of resolver 608. When the position data from the aircraft navigation receivers is in full correspondence with that shown on the display there is no output signal from transformer 613. But whenever there is an amplitude differential between these two signals, an error signal Ye is developed in the secondary winding of differential transformer 613.

If switches 624 and 625 are closed, it is seen that the error signals Xe and Ye are supplied to the stator windings 622 and 623, respectively, of the rotary resolver 621. The rotor 627 of resolver 621 is positioned in accordance with the angular position of disc 502 in computer 151. Thus, in resolver 621, the Xe and Ye coordinate error signals are resolved into a speed error signal in rotor winding 629 and a heading error signal in winding 628.

The speed error signal developed in the output winding 629 of resolver 621 is amplified and supplied to the speed error motor 636. Similarly, the heading error signal developed in resolver winding 628 is utilized, by means of amplifier 631, to energize the heading correction motor 632. These two motors are arranged to rotate rather slowly, at a rate generally proportional to the rundown rate or drift rate of the dead reckoning system comprising the sensing devices 598 and 599 and the computer 151. If the dead reckoning position display system has a very slow drift rate, the correction system can be constructed to operate at very low speeds for the motors 632 and 636 and will, nevertheless, keep the system slaved to the radio navigation receivers.

Two specific examples will afford a better illustration of the correction system. Thus, it may be assumed that the disc 502 is positioned so that the air speed input through integrator 500 is driving the slide rod 456 to the right (east) at the full input speed. For this condition, the Y-coordinate integrator 501 is centered and its output, to slide rod 457, is zero. The correction resolver rotor 627 is so positioned that any Xe error signal feeds only the air speed correction system comprising amplifier 635, motor 636 and integrator 673, increasing or decreasing the air speed input to computer 151 until a balanced condition is achieved with the error signal Xe reduced to zero. No correction is applied to the heading portion of the computer.

Rotating the problem 90°, so that the aircraft heading is to the north, the bell crank disc 502 repositions integrators 500 and 501 so that the air speed motion now appears entirely as movement of slide rod 457, with rod 456 stationary. In this case any error along the X axis, represented by error signal Xe, must be corrected by repositioning disc 502 through the heading correction system comprising amplifier 631, motor 632, and differential 633. But this required result is achieved automatically by the repositioning of resolver rotor 627 through its linkage to disc 502. That is, with the 90° shift, the Xe error signal changes from an air speed correction to a heading correction. The reverse is of course true for the Ye error signal.

Whenever radio navigation signals are lost or interrupted due to external interference, to flying low over rough terrain, or other causes, the dead reckoning navigational system comprising sensing devices 598 and 599 and computer 151 continues to provide substantially accurate navigation information, on display device 71, for a relatively long period of time. Occasional recovery of the radio navigation signals effectively compensates for any loss of accuracy due to drift of the dead reckoning apparatus. It is thus seen that the navigation system of FIG. 6 provides a long term high-accuracy position display that affords effective usable information to the pilot despite the fact that radio navigation signals may be erratic or may be lost for substantial intervals. The correction system works throughout all four quadrants and maintains effective directional sense at all times.

It will be recognized that the continuously corrected dead reckoning computer system 600 of FIG. 6 can be used in conjunction with various forms of rectilinear display navigation systems. The basic heading information is not dependent upon the use of the heading sensing system described in detail in this application. Instead, the primary heading data may be derived from a directional gyro or from a magnetic compass. Doppler speed information or speed and turn accelerometers can be used instead of the specific air speed sensing apparatus described above. In those instances in which heading information is derived from a simple unslaved directional gyro the correction system can be coupled back to the gyro setting system with the result that the gyro will be maintained at a magnetic north setting by virtue of the magnetic north information derived from VOR receiver 602.

Position Computer Electrically

Corrected From Radio Data Source

Figure 7:
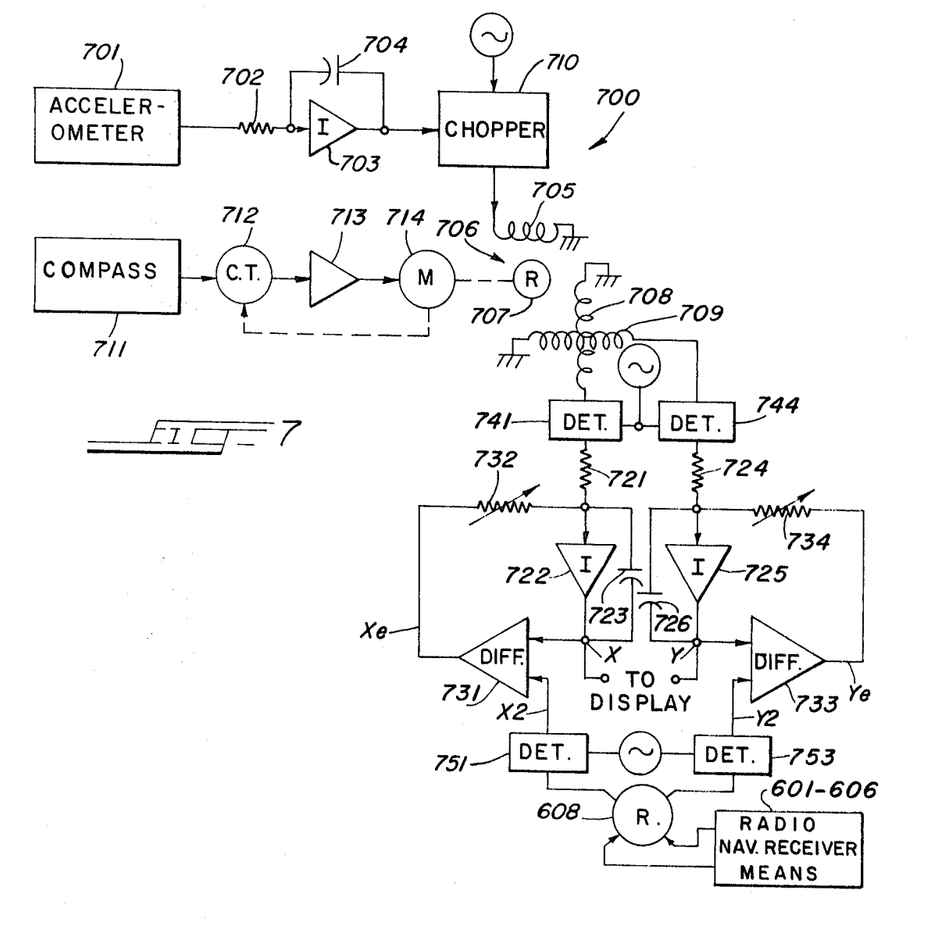
FIG. 7 is a schematic diagram of a dead reckoning computer control system constructed in accordance with yet another embodiment of the invention.

FIG. 7 is a schematic illustration of the principal components of another form of position computer in which, as in the embodiment of FIG. 6, the dead-reckoning position display is corrected in accordance with data received from a radio navigation source. But the inertial navigation system 700 illustrated in FIG. 7 employs an electrical computer and correction system rather than the mechanical arrangement of system 600.

In system 700, the principal speed sensing device comprises an accelerometer 701, which can be of conventional construction. The output of accelerometer 701 is a DC signal that is coupled through a resistor 702 to a small operational amplifier 703. The output of amplifier 703 is coupled back to its input through a coupling capacitor 704 so that the amplifier functions as an integrating circuit. The output of integrating amplifier 703, a DC signal representative of aircraft speed, is converted to an AC signal by appropriate means such as chopper 710 and coupled to the rotor winding 705 of an AC rotary resolver 706 having a rotor 707, on which winding 705 is mounted, and two stator windings 708 and 709.

The basic heading sensing device in the system of FIG. 7 is a compass 711, which may constitute a magnetically corrected gyro compass of conventional construction that affords an electrical output signal indicative of the aircraft heading. The output signal from compass 711 is connected to a synchro control transformer 712, with the output of the control transformer being supplied to an amplifier 713. Amplifier 713 is used to energize a servo motor 714 that is mechanically connected back to control transformer 712 to control the transformer coupling. Motor 714 also is mechanically connected to the resolver rotor 707 to control its position.

One terminal of each of the resolver stator windings 708 and 709 is grounded. The other terminal of winding 708 is connected to a detector 741 which in turn is connected through a series resistor 721 to the input of an operational amplifier 722. Amplifier 722 has a capacitor 723 connected from the amplifier output back to the input. Thus, amplifier 722, in conjunction with resistor 721 and capacitor 723, functions as an integrator circuit.

Similarly, the remaining terminal of resolver stator winding 709 is connected, through a detector 744, to an integrating circuit comprising a series resistor 724, an operational amplifier 725, and a capacitor 726.

Like the system shown in FIG. 6, the inertial navigation system 700 of FIG. 7 utilizes the radio navigation receiver means 601—606, including the resolver 608, to develop two auxiliary coordinate position signals X2 and Y2. The X-coordinate output of resolver 608 is connected, through a detector 751, to one input of a differential amplifier 731 having a second input that is connected to the output of integrator amplifier 722. The output of differential amplifier 731 is connected through an adjustable impedance 732 back to the input of amplifier 722. Similarly, the Y-coordinate output of resolver 608 is connected through a detector 753 to a second differential amplifier 733. Amplifier 733 receives its second input from integrator amplifier 725. The output of amplifier 733 is coupled back through an adjustable impedance 734 to the input for integrator 725. Detectors 741, 744, 751 and 753 may comprise conventional bridge detectors or other suitable detector circuits.

In operation, accelerometer 701 develops an output signal that is representative of the acceleration and deceleration of the aircraft along its longitudinal axis. This acceleration signal is integrated in the integrating amplifier 703, developing a DC signal representative of the aircraft speed. It is this speed signal that is converted to AC in chopper 710 and supplied to the rotor winding 705 of resolver 706.

Rotor 707 of resolver 706 could be driven directly from compass 711 if the compass had sufficient available output of either a mechanical or electrical nature. Usually, however, the compass output is not sufficient for this purpose. In the illustrated system, the servoamplification apparatus 712—714 is employed to determine the angular orientation of the resolver rotor 707 in accordance with the aircraft heading as derived from compass 711.

The output signal developed in stator winding 708 of rotary resolver 706 is a function of both the air speed and the heading of the aircraft in relation to one coordinate axis. This signal, when detected and subsequently integrated in the circuit comprising integrator 722, produces an output signal X comprising a first position signal indicative of changes of the aircraft position in one coordinate direction. The signal from the other resolver stator winding 709 is similarly detected and integrated to produce a Y-coordinate position signal. The X and Y signals from amplifiers 722 and 725 constitute the main position signals that are supplied to a display to identify the position of the aircraft to the pilot. The display may be a position plotter such as plotter 71 described above, with appropriate motor drives. On the other hand, the position display may comprise a course line computer or other position display apparatus; appropriate position display devices, course line computers and guidance systems are well known in the art.

The main position signals X and Y from amplifiers 722 and 725 are supplied to differential amplifiers 731 and 733 respectively. In amplifier 731, the main position signal X is compared with the auxiliary position signal X2 constituting the detected X-coordinate output from resolver 608. That is, the differential amplifier 731 compares the auxiliary position signal X2 from the radio navigation receiver means with the corresponding main position signal X developed by the dead reckoning computer comprising integrators 722 and 725.

Whenever there is a difference between the two input signals to differential amplifier 731, an error signal $Xe$ is developed and this signal is fed back through resistor 732 to the input of the integrating amplifier 732. In this manner, the main position signal X is corrected in accordance with the position error signal developed by the comparison means comprising differential amplifier 731.

Similarly, main position signal Y and the auxiliary position signal Y2 from resolver 608 and detector 753 are supplied to differential amplifier 733 to develop the second position error signal $Ye$. This second error signal $Ye$ is fed back to amplifier 725 through an adjustable resistor 734 to correct the main position signal Y. Resistors 732 and 734 are purposefully made adjustable so that the correction rate can be adjusted for each of the two coordinate halves of the dead reckoning computer comprising the integrating amplifiers 722 and 725. This makes it possible to establish the correction rate at a level commensurate with the maximum overall drift rate of the sensing devices 701 and 711 and the computer itself.

In the foregoing description of specific embodiments of the invention, the primary position data signals for driving the dead reckoning computer are set forth as speed and heading signals. It should be recognized, however, that other primary position signals, derived from appropriate sensing devices, can be employed. Thus, as described in connection with FIG. 7, integrated acceleration signals can be utilized for speed data. Doppler speed data signals can be employed. Integrated turn rate signals can be utilized to derive the requisite directional information. In essence, any sensing devices that provide the basic information on aircraft velocity can be used to drive the computer that actuates the dead reckoning display.

By the same token, other coordinate display arrangements can be substituted for the orthogonal X-Y systems described above. Thus, a polar coordinate display can be used, or even hyperbolic coordinates. However, orthogonal coordinates are usually preferable. And any available radio navigation apparatus, including the known ILS and DECCA systems, can be employed instead of the VORDME equipment described in conjunction with FIGS. 6 and 7.

In each of the control systems described above in which correction control is exercised by radio navigation receiver means and associated resolvers or other computer apparatus, the dead reckoning computer is effectively "slaved" to the radio navigation equipment. For such systems, the position response rate of the slaving means (basically, the comparator) should be less than the response rate of the radio navigation equipment; otherwise, the dead reckoning control would be superfluous. Moreover, the position response rate of the dead reckoning computer that is the basic drive for the position display must be substantially greater than the position rate of change of the aircraft itself for effective operation.

I claim:

1. In an aircraft navigation system of limited long term stability, comprising sensing devices for developing primary position data signals, a position display device, and radio navigation receiver means for developing two radio navigation position signals, a control system comprising:

dead reckoning computer means for resolving said primary data signals into two main coordinate position signals for actuating said position display, said computer means and said display having a response rate at least as great as the maximum position rate of change of the aircraft in which the navigation system is employed;

comparison means for comparing said radio navigation position signals with said main position signals to develop coordinate position error signals; and correcting means for correcting said main position signals in accordance with said position error signals at a limited rate, less than the response rate of said radio navigation receiver means, determined by the maximum overall drift rate of said sensing devices and said computer means.

2. A control system for a navigation system, according to claim 1, and further comprising means, coupled to said computer means, for modifying said two main position signals in accordance with predetermined wind velocity and direction.

3. A control system for a navigation system according to claim 1 in which said dead reckoning computer means comprises a pair of small mechanical integrator devices operated at a predetermined fixed phase differential.

4. A control system for a navigation system according to claim 3 in which each of said integrator devices comprises a ball disc integrator including a disc drive element, a shaft drive element, ball means frictionally engaging said disc and said shaft, and positioning means for displacing said ball means across the surface of the disc to vary both the drive ratio between the disc and the shaft and the direction of rotation of one of the drive elements, the positioning means of the two integrators being maintained at a constant differential of approximately 90° in orientation with respect to each other, a primary data signal pertaining to air speed being employed to control the rotational speed of one of said drive elements and a primary data signal pertaining to a heading being used to control the positioning means of the two ball disc integrators.

5. A control system for a navigation system according to claim 3 in which each of said position error signals is an alternating current signal and in which said correcting means comprises an AC rotary resolver for resolving said position error signals into air speed and heading correction signals.

6. A control system for a navigation system according to claim 5 in which said correcting means further includes a ball disc integrator conjointly controlled by the air speed correction signal and the speed position data signal, said ball disc integrator being mechanically connected into the input of said computer means.

7. A control system for a navigation system according to claim 5 in which said correcting means further includes a differential drive unit having two inputs and a single output with the two inputs actuated in accordance with said heading position data signal and said heading correction signal respectively, said differential being mechanically connected in the input to said dead reckoning computer means.

8. A control system for a navigation system according to claim 5 in which said comparison means comprises a pair of differential transformers, one for each coordinate axis of the display device.

9. A control system for a navigation system according to claim 1 in which said computer means comprises a rotary AC resolver controlled in accordance with said primary position data signals and having two coordinate outputs, and an integrator circuit connected to each of the outputs of said resolver.

10. A control system for a navigation system according to claim 9 in which said comparison means comprises a pair of differential amplifiers each having two inputs, with one input of each differential amplifier receiving one of said coordinate position signals and the other input of the same amplifier receiving a corresponding radio navigation position signal, and in which said correcting means comprises a pair of feedback circuits, one from each differential amplifier to the associated integrator circuit.

11. A control system for a navigation system according to claim 1 in which a primary position data signal for heading of the aircraft is developed as the integrated output of a turn rate sensor.

12. A control system for a navigation system according to claim 1 in which a primary position data signal for speed of the aircraft is developed from the integrated output of an accelerometer for detecting acceleration of the aircraft.

13. An aircraft navigation computer system comprising:

a position display device;

a dead reckoning computer, controlled by dead reckoning sensors contained within said aircraft, for actuating said display device, said dead reckoning computer and said display device having a response rate at least as great as the maximum position rate of change of the aircraft in which the navigation system is employed;

a radio navigation position computer controlled by radio navigation receiver means contained within the aircraft and responsive to signals from fixed location radiating facilities;

comparison means for comparing the outputs of said dead reckoning and radio navigation computers to develop position error signals;

and followup means for correcting said dead reckoning computer in accordance with said position error signals at a correction rate, less than the response rate of said radio navigation receiver means, dependent upon the position drift rate of said dead reckoning computer.

14. An aircraft navigation system comprising a position display device, a radio navigation position computer, a dead reckoning position computer, and means for slaving said dead reckoning computer to said radio navigation position computer, in which the position response rate of said slaving means is substantially less than the response rate of said radio navigation position computer and the position response rate of said dead reckoning position computer is substantially greater than the position rate of change of said aircraft.

15. An aircraft navigation display system comprising:

position display means actuated by position coordinate signals;

dead reckoning navigation means for developing position coordinate signals to actuate said position display means, said dead reckoning navigation means having a position drift rate less than the maximum position coordinate rate of change of the aircraft;

radio navigation means for developing independent position coordinate signals;

means for comparing said dead reckoning position coordinate signals and said radio navigation position coordinate signals to develop error signals;

and means for slaving said dead reckoning position coordinate signals to said radio navigation position coordinate signals in response to said error signals at a slewing rate substantially less than said position coordinate rate of change of said aircraft.

16. An aircraft navigation display system according to claim 15, in which said dead reckoning navigation means comprises:

turn sensing means for developing a turn signal representative of angular velocity of the aircraft about a vertical axis;

speed sensing means for developing a speed signal representative of the forward speed of the aircraft;

and computer means, connected to both said sensing means, for developing said position coordinate signals from said turn and speed signals.

17. An aircraft navigation display system according to claim 16, in which said dead reckoning navigation means further comprises a position indicator movable across a display field, comprising a map of the flight area, in two coordinate directions and in response to respective ones of said position coordinate signals, to indicate movement of the aircraft relative to a given starting point within the field.

18. An aircraft navigation display system according to claim 16, said system further comprising:

a fixed direction indicator;
an annular heading scale encompassing said direction indicator and rotatable to indicate the heading of the aircraft;

and integrating means, connected to said turn sensing means, for rotating said heading scale in accordance with the time integral of said turn signal.